United States Patent [19]

Grate

[11] Patent Number: 5,756,631
[45] Date of Patent: May 26, 1998

[54] SILOXANES WITH STRONG HYDROGEN BOND DONATING FUNCTIONALITIES

[75] Inventor: Jay W. Grate, West Richland, Wash.

[73] Assignee: The United States of America as represented by the Secretary of the Navy, Washington, D.C.

[21] Appl. No.: 250,768

[22] Filed: May 27, 1994

[51] Int. Cl.$^6$ ............................................. C08G 77/385
[52] U.S. Cl. ........................... 528/26; 528/32; 528/43;
    436/111; 436/112; 436/113; 436/120; 436/121;
    436/131; 436/132; 436/103; 436/104; 436/105;
    422/82.05; 422/82.06; 422/82.09; 422/82.11;
    422/83; 422/86; 422/88; 422/82.01; 524/863
[58] Field of Search ........................... 528/32, 26, 43;
    436/111, 112, 113, 120, 121, 131, 132,
    103, 104, 105; 422/82.05, 82.06, 82.09,
    82.11, 83, 86, 88, 82.01; 524/863; 556/449

[56] References Cited

U.S. PATENT DOCUMENTS

| | | | |
|---|---|---|---|
| 4,075,168 | 2/1978 | Ponomarey et al. | 260/46.5 R |
| 4,376,210 | 3/1983 | Chang | 556/450 |
| 4,611,042 | 9/1986 | Rivers-Farrell et al. | 508/32 |
| 5,136,069 | 8/1992 | DeVries et al. | 556/453 |

OTHER PUBLICATIONS

McGill et al., "Fire Detection FY Surface Acoustic Ware Chemical Sensor Systems", pp. 10, 11, 44, 45, 1993.
Brumfield, "Proceedings–By93 Office of Naval Technology Fall Review for Chemical/Biological Warfare" 1993.
Abraham et al., "Hydrogen Bonding XXIX. The characterisation of . . . a new solvation equation".
Grate et al., "Determination of Partition Coefficients from Surface Acoustic Wave Vapor Sensor Responses and Correlation with Gas–Liquid Chromatographic Partition Coefficients", Analytical Chemistry, vol. 60, pp. 869–875 (1988).
Ting et al., "Compatibility Studies fof Poly(styrene–co–vinylphenyl Hexafluorodimethyl Carbinol) with Bisphenol A Polycarbonate, Poly(butyl methacrylate), and Poly(2, 6–Dimethyl–1,4–Phenylene Oxide)", Journal of Polymer Science: Polymer Letters Edition, vol. 18, pp. 201–209 (1980).
Chang et al.,"Polymer Sorbents for Phosphorus Esters: I. Selection of Polymers by Analog Calorimetry", Polymer Engineering and Science, vol. 27, No. 10, pp. 693–702 (1987).
Barlow et al., "Polymer Sorbents for Phosphorus Esters: II. Hydrogen Bond Driven Sorption in Fluoro–Carbinol Substituted Polystyrene", Polymer Engineering and Science, vol. 27, No. 10, pp. 703–715 (1987).
Snow et al., "Progress on Fluoroalcohol Microsensor Coatings", Enclosure (1) to NRL Letter Ser. 6120–884, NRL Prob. 61–0021 (1986).
Sprague et al., "Synthesis and Evaluation of Hexafluoro–dimethylcarbinol Functionalized Polymers as SAW Micro–sensor Coatings", Proceedings of the 1987 U.S. Army Chemical Research Development and Engineering Center Scientific Conference on Chemical Defense Research, pp. 1241–1251 (1987).

Urry et al., "Multiple Multicenter Reactions of Perfluoro Ketones with Olefins" The Journal of Organic Chemistry, vol. 33, No. 6, pp. 2302–2311 (1968).
McGill et al., "Fire Detection by Surface Acoustic Wave Chemical Sensor Systems", NRL/MR/6170—93–7421, pp. 10–11, and 44–45 (1993).
Grate et al., "Surface Acoustic Wave Vapor Sensors Based on Resonator Devices", Analytical Chemistry, vol. 63, No. 17, pp. 1719–1727 (1991).
Brumfield, "Triannual Report" Advanced Sensor Coating, Jun. 93 through Oct 1993.
Brumfield, "Proceedings—FY93 Office of Naval Technology Fall Review for Chemical/Biological Warfare", Naval Surface Warfare Center, NSWCDD/MP–93/133, Apr. 1993.
Abraham et al., "Hydrogen bonding. XXIX. The characterisation of fourteen sorbent coatings for chemical microsensors using a new solvation equation".
Grate et al., "Smart Sensor System For Trace Organophosphorus and Organosulfur Vapor Detection Employing a Temperature–Controlled Array of Surface Acoustic Wave Sensors, Automated Sample Preconcentration, and Pattern Recognition", Analytical Chemistry, vol. 65, pp. 1869–1881 (1993).
Gate et al., "Solubility Interaction and the Design of Chemically Selective Sorbent Coatings For For Chemical Sensors and Arrays", Sensors and Actuators, pp. 85–111, (1991).

Primary Examiner—Margaret W. Glass
Attorney, Agent, or Firm—Thomas E. McDonnell; Barry A. Edelberg

[57] ABSTRACT

Viscous, liquid hexafluoroisopropanol-siloxane polymers having the basic structure:

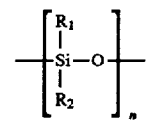

wherein $R_1$ is a monovalent hydrocarbon radical selected from the group consisting of $C_1$–$C_6$ alkyl groups; cyclohexyl groups and phenyl groups;

$R_2$ is

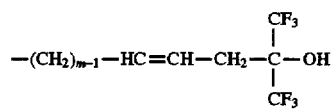

wherein m=1 to 4; and n is an integer greater than 1, are useful for rapid, reversible vapor sorption, especially for hydrogen bond accepting vapors.

18 Claims, 2 Drawing Sheets

SILOXANES WITH STRONG HYDROGEN BOND DONATING FUNCTIONALITIES

BACKGROUND OF THE INVENTION

1. Field of the Invention

The present invention relates generally to sorbent siloxane compounds, and more specifically to fluorinated siloxane polymers.

2. Description of the Background Art

Devices for molecular recognition typically include a substrate, such as a piezoelectric material or a waveguide, and a molecular recognition coating upon the substrate. These devices may be used, for example, in chemical vapor sensing or the selective separation of gases by gas chromatography. Some molecular recognition devices are described in Grate et al., *Sensors and Actuators B*, 3 (1991) 85–111 and Grate et al., *Analytical Chemistry*, Vol. 65, No. 14, Jul. 15, 1993, both of which are incorporated herein by reference in their entireties.

One illustrative example of a device relying upon molecular recognition at a surface is known as a surface acoustic wave (SAW) sensor. SAW devices function by generating mechanical surface waves on a thin slab of a piezoelectric material (such as quartz) that oscillates at a characteristic resonant frequency when placed in a feedback circuit with a radio frequency amplifier. The oscillator frequency is measurably altered by small changes in mass and/or elastic modulus at the surface of the SAW device.

Vapor sensitivity is typically achieved by coating the device and selectively surface with a thin film of a stationary phase that will selectively absorb and concentrate the target vapor. Vapor sorption increases the mass of the surface film and decreases its modulus. A shift in the oscillator frequency is observed and measured.

SAW devices offer many advantages as chemical sensors including small size, low cost, ruggedness and high sensitivity. They can be adapted to a variety of gas-phase analytical problems by designing or selecting specific coatings for particular applications. For example, strong hydrogen bond donating character is important for the detection of species which are hydrogen bond acceptors such as toxic organophosphorus compounds. Of course, the present invention, while applicable to SAW devices, is also applicable to other molecular recognition devices.

Generally, the material used as the chemically active selectively absorbent layer, molecular recognition coating of a molecular recognition device, should be a non-volatile liquid or elastomeric polymer. Volatile materials are not suitable because they will result in a sensor with drift and a short lifetime. Glassy or crystalline materials are undesirable because vapor diffusion into them may be retarded, and changes in physical state due to vapor sorption could cause hysteresis.

Grate et al. in *Analytical Chemistry*, Vol. 60, No. 9, 869–875 (1988), incorporated herein by reference in its entirety, disclose a compound called "fluoropolyol" (FPOL) which can be used for detection of organophosphorus compounds. It is elastomeric at room temperature and contains hydroxyl groups, which are hydrogen bond donating.

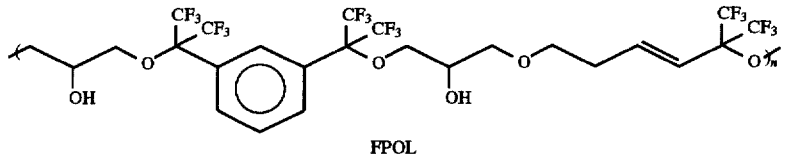

FPOL

Ting, Pearce, and Kwei investigated polystyrene substituted with hexafluoroisopropanol (HFIP) groups for its compatibility with other polymers, in the *Journal of Polymer Science: Polymer Letters Edition*, Vol. 18, 201–209 (1980). The essential sections of which are herein incorporated by reference. Chang et al. and Barlow et al. investigated a similar material for its use as a sorbent for organophosphorus vapors, and examined its behavior on a bulk quartz crystal monitor device in *Polymer Engineering and Science*, Vol. 27, No. 10, 693–702; and 703–715 (May 1987). The essential sections of these articles are also incorporated herein by reference.

Snow and coworkers (*NRL Letter Report* 6120–884A; incorporated herein by reference), and Sprague et al. (*Proceedings of the 1987 U.S. Army Chemical Research Development and Engineering Center Scientific Conference on Chemical Defense Research*, page 1241; incorporated herein by reference), reported making materials containing HFIP which were based on polystyrene and poly(isoprene) polymer backbones. These materials, used as coatings on molecular recognition devices such as SAW sensors, showed high sensitivity for organophosphorus vapors, but both the parent polymers and the HFIP containing materials are glassy or crystalline at room temperature. Because vapor diffusion may be retarded in glassy or crystalline materials, and/or changes in physical state due to vapor sorption, could cause hysteresis, these materials are not fully acceptable.

SUMMARY OF THE INVENTION

It is an object of the present invention to provide novel, viscous, liquid siloxane-based polymers which are useful for rapid reversible vapor sorption.

A further object of the present invention is to provide improved coatings and vapor sorption compositions for chemical sensors which are highly sensitive, reversible and have selective absorptions for particular vapors, especially hydrogen bond accepting vapors such as organophosphorus compounds.

These and other objects are achieved by hexafluoroalcohol siloxane polymers comprising the basic structure:

$R_2$ is

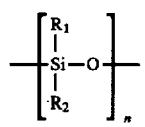

wherein $R_1$ is a monovalent hydrocarbon radical selected from $C_1$–$C_6$ alkyl groups, cyclohexyl groups and phenyl groups;

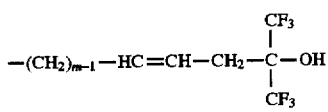

$$-(CH_2)_{m-1}-HC=CH-CH_2-\underset{\underset{CF_3}{|}}{\overset{\overset{CF_3}{|}}{C}}-OH$$

wherein m=1 to 4; and n is an integer greater than 1.

Further objects, features and advantages of the present invention will be readily apparent to those skilled in this art upon reading the following detailed description of the preferred embodiment.

DETAILED DESCRIPTION OF THE PREFERRED EMBODIMENT(S)

The process of sorption plays a key role in the performance of chemical sensors for gas phase analysis. For example, microsensors which consist of a physical transducer and a selective sorbent layer, sense changes in the physical properties of the sorbent layer on the surface of the transducer due to the sorption of analyte molecules from the gas phase into the sorbent layer. It is the consequent modification of the sensed properties of the sorbent layer that results in the detection of the analyte molecules in the gas phase.

The novel, viscous, sorbent hexafluoroisopropanol-siloxane polymers of the present invention are strongly hydrogen bond donating. They are useful in a variety of applications, especially as a coating material on chemical sensors. They have the advantage of existing in the ideal liquid physical state for rapid reversible vapor sorption and are very sensitive for hydrogen bond accepting vapors such as organophosphorus compounds.

These novel hexafluoro-polysiloxanes can be synthesized by reacting hexafluoroacetone with an allyl-substituted polysiloxane, taking advantage of the reactivity of perfluoroketones with terminal olefins as described by Urry et al., *J. Org. Chem.*, Vol. 33, pp. 2302–2310 (1968), incorporated herein by reference. The reaction can be represented by the general equation:

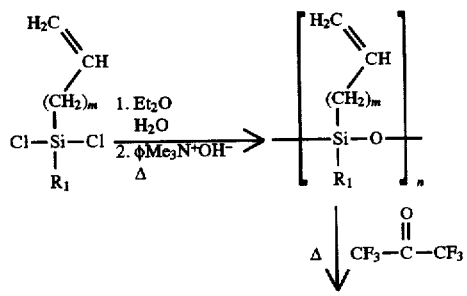

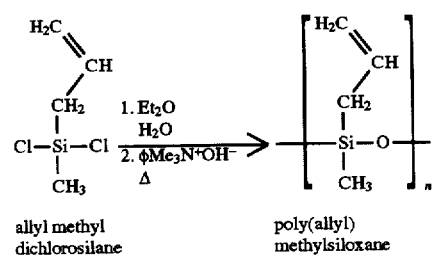

wherein $R_1$ is a monovalent hydrocarbon radical selected from $C_1$–$C_6$ alkyl groups, cyclohexyl groups and phenyl groups; typically $R_1$ is a lower alkyl of 1 to 6 carbon atoms; most often $R_1$ is methyl; m is 1 to 4; typically m is 1 to 2; most often m is 1; and n is an integer greater than 1 and should be as high as possible. Typically, n is 1 to 10, and is most often 4 to 10. The above formula for the oligomer includes cyclic oligomers. The formation of these cyclic oligomers is both a possible and probable consequence of the above shown reaction scheme.

The method for coating the novel hexafluoro-polysiloxanes of the present invention onto a substrate is not critical, and various coating methods known in the art may be used. Typically, the coating is applied to the substrate in solution, either by dipping, spraying or painting. The concentration of the novel hexafluoro-polysiloxanes in the coating solution should be sufficient to provide the viscosity most appropriate for the selected method of coating, and may be empirically determined. The solvent used, although not critical, should be sufficiently volatile to facilitate quick and easy removal, but not so volatile as to complicate handling of the coating solution prior to its deposition upon the substrate.

Figure 2:
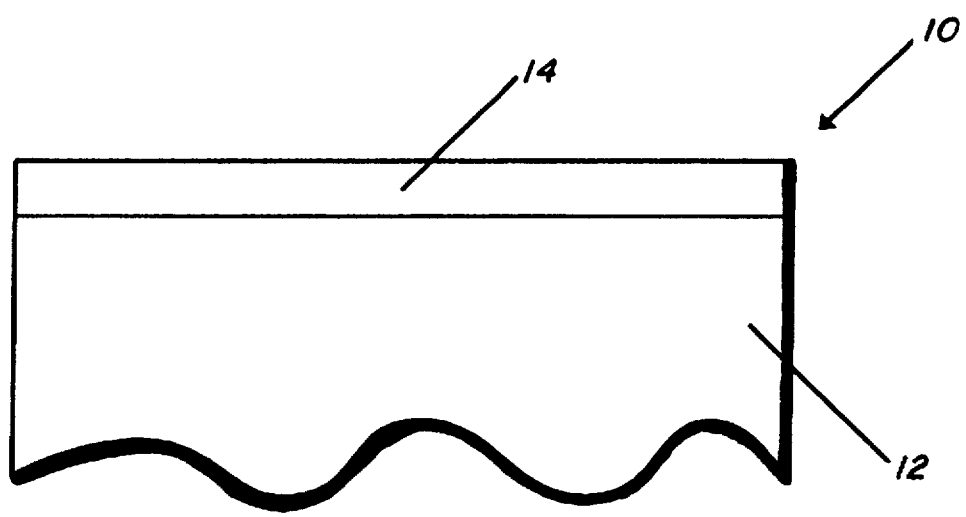
FIG. 2 schematically shows the upper part of a sensing portion of a molecular recognition device using the novel materials of the present invention.

FIG. 2 schematically shows the upper (outer) part of the sensing portion 10 of a molecular recognition device. Substrate 12 may be, for example, a piezoelectric transducing element, or a waveguide that carries light or another form of energy to and/or from the sensing surface coating 14 upon substrate 12. Sensing surface coating 14 comprises the novel hexafluoro-polysiloxanes according to the present invention.

The invention will be further clarified by a consideration of the following example, which is intended to be purely exemplary of the use of the invention.

EXAMPLE allyl methyl dichlorosilane poly(allyl) methylsiloxane $$\left[ \begin{array}{c} H_2C \\ \parallel \\ CH \\ | \\ CH_2 \\ | \\ -Si-O- \\ | \\ CH_3 \end{array} \right]_n + CF_3-\overset{O}{\underset{\parallel}{C}}-CF_3 \xrightarrow{\Delta}$$

poly(allyl)
methylsiloxane $$\left[ \begin{array}{c} CF_3 \quad \diagdown \quad OH \\ \diagdown \quad / \\ C \\ / \quad \diagdown \\ H_2C \quad CF_3 \\ \diagdown \\ CH \\ \parallel \\ CH_2 \\ | \\ -Si-O- \\ | \\ CH_3 \end{array} \right]_n$$

viscous liquid hexafluoro-
isopropanolsiloxane (HFIP-
siloxane)

HFIP-siloxane is a new polysiloxane material synthesized by the reaction of hexafluoroacetone with an allyl-substituted polysiloxane. Initially, 10.8 g of methylallyl dichlorosilane were dissolved in 25 mL of diethyl ether. Then 100 mL of water were added, slowly at first (to control the boiling of the ether) and stirred for 5 hours. Additional ether was added, the phases were separated, and the polysiloxane was obtained from the ether phase (after drying with $MgSO_4$) by evaporation. Yield 6.93 g, theoretical, 6.97 g. IR spectra confirmed the formation of siloxane bridges, terminal Si—OH, and the presence of the carbon-carbon double bond.

Over a three week period, dense droplets assumed to be water generated by the condensation of Si—OH groups separated from the material. The polysiloxane was taken up in ether, dried with $MgSO_4$, and the ether was evaporated. To this sample, 10 drops of 0.2M phenyltrimethylammonium hydroxide in methanol were added and the sample was heated at 380-400K for one hour to catalyze chain lengthening. Finally a vacuum was applied to the hot sample to remove any volatiles. An IR spectrum confirmed that fewer Si—OH groups were present.

Then 5 g of the poly(allyl)methylsiloxane were added to a glass-lined stainless steel Parr bomb and the sample was purged with nitrogen and evacuated. Following this, 33.3 g of gaseous hexafluoroacetone were added, which is about four times excess relative to allyl groups, assuming a 1:1 stoichiometry. The reaction temperature was raised to 370K and held at 370K to 380K for 43 hours. After cooling, the excess hexafluoroacetone was recovered by vacuum transfer and weighed, 22.9 g. The 10.4 g consumed compares with 8.3 g that would be consumed assuming a 1:1 stoichiometry with the allyl groups (i.e., 125% incorporation of hexafluoroacetone as hexafluoroisopropanol groups based on apparent hexafluoroacetone consumption).

Dry nitrogen was passed over the sample at 310K overnight to drive off residual hexafluoracetone, and then the sample was evacuated for 1 hour. The yield of polymer was 12.06 g, compared to a theoretical yield of 13.3 g for one hexafluoroacetone reacting with each allyl group. This indicates at least 84% incorporation of hexafluoroacetone as hexafluoroisopropanol groups.

From the two results, 125% incorporation based on hexafluoroacetone consumed, and 84% based on the weight gain of the polymer, and the known chemistry of hexafluoroacetone with olefins, it was concluded that the sample contains about 1 hexafluoroisopropyl group per monomer unit. The IR spectrum confirmed the presence of the hydroxyl groups, new carbon fluorine bonds, disappearance of the allyl functionality, and a new carbon-carbon double bond. The product is a viscous liquid whose density was measured in a calibrated tube: 1.48 $mL^{-1}$ at 298K.

Given the toxicity of modern organophosphorous nerve agents and pesticides, non-toxic analog compounds are used in the laboratory for testing. These are referred to as agent simulants. Dimethyl methyl phosphonate (DMMP) a relatively non-toxic material and dimethylacetamide (DMAC) are examples of agent simulants and target vapors. The hexafluoroisopropanol-siloxane polymer (HFIP-siloxane) was utilized as a SAW coating and has proved to be extremely selective and sensitive for agent simulants and target vapors.

Spray coated HFIP-siloxane polymer films were applied to a 200 MHz SAW resonator by using an airbrush supplied with compressed dry nitrogen and a dilute solution of the polymer in HPLC-grade chloroform (Aldrich). The polymer was applied over the entire surface of the sampling SAW sensor. The SAW frequency was monitored during deposition; the change in frequency provides a measure of the amount of material applied. To begin coating, the airbrush was placed several inches away from the SAW device and spraying was initiated with the nozzle directed away from the device. Then the spray was passed over the device several times, followed by a pause to observe the change in frequency. This process was repeated many times until the desired frequency change (a measure of the desired thickness) was obtained.

Spray-coated films were examined by optical microscopy with a Nikon Optiphot M microscope using reflected light Nomarski differential interference contrast.

The sensitivity and selectivity of the coating was determined by flowing vapor streams of a test analyte generated from bubbler sources and diluted by using a Microsensor Systems VG-7000 vapor generation instrument. The bubblers were maintained at 15° C. in machined aluminum blocks with inlets and outlets for water from a refrigerated circulating water bath. The carrier gas for bubbler vapors was dry nitrogen supplied to the bubblers at 120 mL/min with electronic flow controllers. The saturated bubbler vapor streams were diluted by the VG-7000 using a pulse-width modulation method. The experiments were all conducted with the saturated (at 15° C.) vapor streams diluted by a factor of 4. Finally, the instrument output can be either the diluted vapor stream or clean carrier gas, each at a flow rate of 120 mL/min.

Saturated vapor streams were calibrated gravimetrically by trapping the vapor in tared glass tubes containing activated charcoal and molecular sieves in series. These calibrations were in agreement with vapor concentrations calculated from published vapor pressures and the ideal gas law.

The VG-7000 was connected to a Macintosh computer with a serial communications line. Commands were delivered for each experiment by using a communications program (Smartcom II); sequences of experiments were programmed by using the macro or "autopilot" capabilities of this program.

Sensor exposure experiments were carried out by first generating and equilibrating a vapor stream for 45 minutes while delivering a clean carrier gas to the sensor. Vapor was then delivered to the sensor for 5 minutes, followed by 10 minutes of clean carrier gas for sensor recovery, another 5 minutes of vapor to check response reproducibility, and another 10 minutes of clean carrier gas. Thus, each experiment takes 75 minutes. Sensor frequency data were collected every 12 seconds beginning 10 minutes prior to the first vapor exposure. The two consecutive exposures were quite reproducible. The coated sensors responded to the steady-state response within two data points after the beginning of a vapor exposure and were recovered in a similar period of time when the vapor stream was replaced with clean carrier gas.

Before each 75-minute experiment described above, a 75-minute control experiment was run to ensure that no residual vapors were present in the instrument that could cause a sensor response. The carrier gas flows and timing of the control experiment were identical with those of the subsequent vapor experiment, except that the bubbler was bypassed. The 45-minute equilibration time served to flush out any traces of vapor that may have adsorbed to tubing walls during the previous experiment. Following the sensor frequency during the subsequent "vapor"/clean carrier gas output cycles provided an experimental determination that the system is adequately flushed. If the sensor frequency shifts were absent or negligibly small, then the response in the subsequent experiment was certain to be due to the vapor from the bubbler selected.

A 158-MHz dual delay-line SAW vapor sensor whose response characteristics were well-known was always placed in series after the experimental sensor and its responses were monitored. The consistent responses of this sensor from data set to data set confirmed that the programmed vapor streams were being generated and delivered.

Additional information concerning investigations of 200-, 300-, and 400 MHz quartz SAW resonators for organic vapor detection, with emphasis on the performance of the 200-MHz devices can be found in Grate et al.'s article "Surface Acoustic Wave Vapor Sensors Based on Resonator Devices" published in *Analytical Chemistry*, Sep. 1, 1991, pp. 1719–1727 by the American Chemical Society which is, herein, incorporated by reference in its entirety for all purposes.

Figure 1:
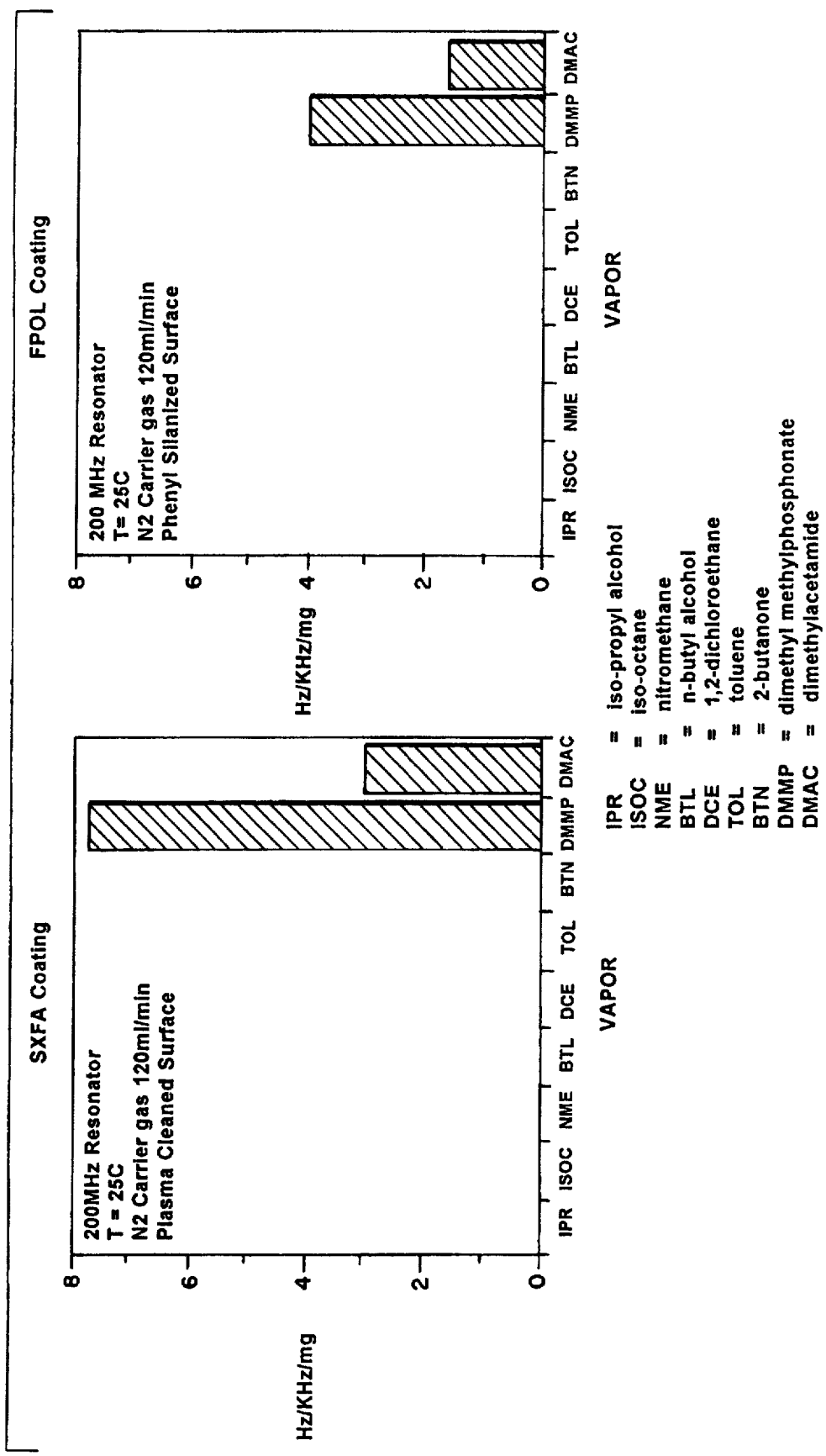
FIG. 1 is a graphic depiction showing superior responses using the present hexafluoroisopropanol-siloxane polymer as a molecular recognition coating on a SAW device compared with fluoropolyol as the molecular recognition coating on a SAW device.

Although not bound by theory, it is believed the hexafluoro-isopropanol chemical moiety interacts with DMMP through hydrogen bond formation. It is obvious from the comparative responses for the 200 MHz SAW Resonator Coatings depicted in FIG. 1 that an improved coating material with increased sensitivity bonding between the hexafluoroisopropanol-siloxane polymer and the DMMP (phosphorous ester) and DMAC has been developed. The improvement in sensitivity is two-fold over the previous most sensitive polymer (fluoropolyol) and the selectivity is greater for agent simulants over other classes of vapors as can be seen in the graph depicted in FIG. 1.

Additionally, in tests to identify fires, and decontamination tests, the HFIP-siloxane hexafluoroisopropanol-siloxane polymer coated sensor was outstanding. The particular problem of detecting vapors given off from a variety of fire fuels provides a complex challenge. Mixture of fire vapors are complex and normally not all decomposition products are known. It is clear that a wide range of organic vapors are released from different fire fuels. McGill et al. report in "Fire Detection by Surface Acoustic Wave Chemical Sensor Systems,"NRL/MR/6170-93-7421 that in order to meet these challenges, a 4 SAW device array was tested having four different polymer coatings including HFIP-siloxane. HFIP-siloxane, being a strong hydrogen-bond acid, was successful in providing information about hydrogen-bond basic vapors.

Other embodiments of the invention will be apparent to the skilled in the art from a consideration of this specification or practice of the invention disclosed herein. It is intended that the specification and example be considered as exemplary only, with the true scope and spirit of the invention being indicated by the following claims.

What is claimed is:

1. A liquid hexafluorosiloxane polymer having backbone units of the formula:

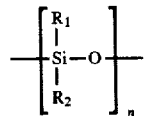

wherein $R_1$ is a monovalent hydrocarbon radical selected from the group consisting of $C_1$–$C_6$ alkyl groups; cyclohexyl groups and phenyl groups;

$R_2$ is

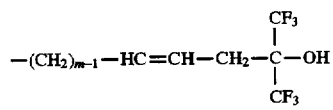

m=1 to 4; and n is an integer greater than 1.

2. A polymer according to claim 1, wherein $R_1$ is selected from the group consisting of $C_1$–$C_6$ alkyl groups.

3. A polymer according to claim 2, wherein m is 1.

4. A polymer according to claim 3, wherein $R_1$ is a methyl group.

5. A device for selective molecular recognition, said device comprising a sensing portion including a substrate, said substrate having thereon a coating of a hexafluorosiloxane polymer having backbone units of the formula:

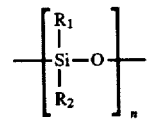

wherein $R_1$ is a monovalent hydrocarbon radical selected from the group consisting of $C_1$–$C_6$ alkyl groups; cyclohexyl groups and phenyl groups;

$R_2$ is

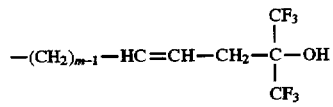

m =1 to 4; and n is an integer greater than 1.

6. The device of claim 5, wherein $R_1$ is selected from the group consisting of $C_1$–$C_6$ alkyl groups.

7. The device of claim 5, wherein $R_1$ is a methyl group.

8. A chemical vapor sensor according to claim 5.

9. A surface acoustic wave device according to claim 8.

10. A solution for preparing a chemical vapor sensor comprising an amount of a polymer according to claim 1 effective to enhance the sensitivity of said sensor to hydrogen bond accepting vapors, and a solvent for said polymer.

11. A solution for preparing a chemical vapor sensor comprising an amount of polymer according to claim 2 effective to enhance the sensitivity of said sensor to hydrogen bond accepting vapors, and a solvent for said polymer.

12. A solution for preparing a chemical vapor sensor comprising an amount of polymer according to claim 3 effective to enhance the sensitivity of said sensor to hydrogen bond accepting vapors, and a solvent for said polymer.

13. A method of detecting a hydrogen bond accepting vapor, comprising the step of contacting said hydrogen bond accepting vapor with said coating of said device according to claim 5.

14. A method of detecting a hydrogen bond accepting vapor, comprising the step of contacting said hydrogen bond accepting vapor with said coating of said device according to claim 6.

15. A method of detecting a hydrogen bond accepting vapor, comprising the step of contacting said hydrogen bond accepting vapor with said coating of said chemical vapor sensor according to claim 7.

16. A method of detecting an organophosphorus compound, comprising the step of contacting said organophosphorus compound with said coating of said device according to claim 7.

17. A method of detecting dimethylacetamide, comprising the step of contacting dimethylacetamide with said coating of said device according to claim 5.

18. A method of detecting dimethyl methylphosphonate, comprising the step of contacting dimethyl methylphosphonate with said coating of said device according to claim 5.

* * * * *